United States Patent
Krogh et al.

(10) Patent No.: US 8,494,690 B2
(45) Date of Patent: Jul. 23, 2013

(54) FLIGHT CONTROLLER MANAGEMENT SYSTEM WITH A BACKDRIVE MONITOR

(75) Inventors: Steven Barry Krogh, Issaquah, WA (US); William Milo Bresley, Sammamish, WA (US); Ian M. Conner, Seattle, WA (US); Benjamin D. Levine, Seattle, WA (US); Jasmine Beth Minteer-Levine, Seattle, WA (US); Ryan L. Pettit, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 13/094,000

(22) Filed: Apr. 26, 2011

(65) Prior Publication Data
US 2012/0277933 A1 Nov. 1, 2012

(51) Int. Cl.
*G05D 1/00* (2006.01)
(52) U.S. Cl.
USPC .............................. 701/11; 701/41
(58) Field of Classification Search
USPC ................. 244/223–229; 701/2–11, 41
See application file for complete search history.

(56) References Cited

U.S. PATENT DOCUMENTS

| | | | | |
|---|---|---|---|---|
| 3,425,649 | A * | 2/1969 | Colwell et al. | 244/194 |
| 4,236,685 | A * | 12/1980 | Kissel | 244/223 |
| 4,642,774 | A * | 2/1987 | Centala et al. | 701/8 |
| 5,197,697 | A * | 3/1993 | Lyloc et al. | 244/197 |
| 5,456,428 | A * | 10/1995 | Hegg | 244/229 |
| 5,493,497 | A * | 2/1996 | Buus | 701/4 |
| 5,694,014 | A * | 12/1997 | Hegg et al. | 318/564 |
| 5,797,564 | A | 8/1998 | Cartmell et al. | |
| 5,806,806 | A * | 9/1998 | Boehringer et al. | 244/196 |
| 5,868,359 | A | 2/1999 | Cartmell et al. | |
| 6,675,076 | B1 * | 1/2004 | Moody | 701/11 |
| 6,913,226 | B2 * | 7/2005 | Huynh | 244/75.1 |
| 8,050,780 | B2 * | 11/2011 | Tessier et al. | 700/63 |
| 2007/0050100 | A1 * | 3/2007 | Gustafson et al. | 701/3 |

* cited by examiner

*Primary Examiner* — Mary Cheung
*Assistant Examiner* — Anne Mazzara
(74) *Attorney, Agent, or Firm* — Yee & Associates, P.C.

(57) ABSTRACT

A method and apparatus for a monitoring module. The monitoring module is configured to identify a difference between measured position information for a controller and expected position information for the controller. The monitoring module is configured to compare the difference with thresholds for managing an autopilot in a control system of a vehicle to form a comparison. The monitoring module is configured to manage an operation of the autopilot based on the comparison such that the autopilot remains operating when a backdrive system is inoperative and an intentional override of the autopilot is absent.

20 Claims, 11 Drawing Sheets

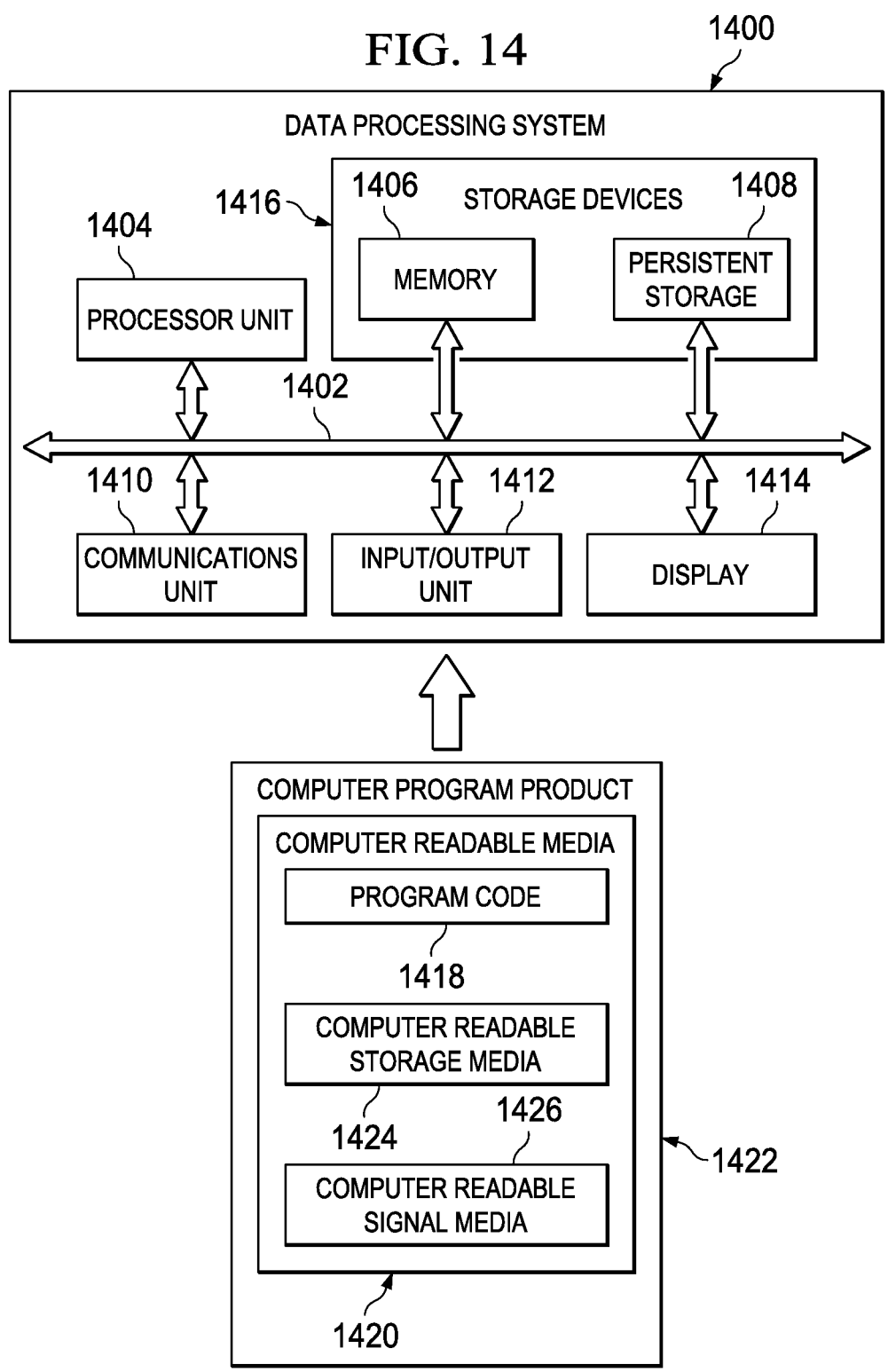

FLIGHT CONTROLLER MANAGEMENT SYSTEM WITH A BACKDRIVE MONITOR

BACKGROUND INFORMATION

1. Field:

The present disclosure relates generally to aircraft and, in particular, to flight management control systems in aircraft. Still more particularly, the present disclosure relates to a method and apparatus for managing a flight control system in an aircraft.

2. Background:

An aircraft flight control system typically includes components, such as control surfaces, controllers in the cockpit, mechanisms to change the position of the flight control surfaces, and linkages connected to mechanisms that move the flight control surfaces. This type of flight control system provides a pilot with tactile and visual information regarding the position of the flight control surfaces. The tactile and visual information may occur through the orientation of the controllers in the cockpit.

Many pilots are familiar with the use of these types of mechanical control systems. As a result, this familiarity provides a pilot with a certain level of psychological assurance that the flight control system is operating correctly based on the tactile and visual information obtained from the position of the controllers.

This type of flight control system also provides tactile and visual information about the operation of the flight control surfaces through the controllers when an autopilot is engaged. For example, the autopilot system may be connected to the flight control system that is controlled through the use of actuators. These actuators are connected and parallel with the system's mechanical linkages. In this manner, the actuators move the flight control surfaces and controllers, such as the column, wheels, and pedals. These controllers are moved by the mechanical linkages as the flight control surfaces move.

A pilot may maintain an awareness of the operations performed by the autopilot based on the tactile and visual information provided by the position controllers. Some types of flight control systems, however, do not use mechanical linkages between the controllers and the flight control surfaces.

For example, one such flight control system is a fly-by-wire control system. With this type of flight control system, pilot command input through the controllers are converted into electrical signals by the controller. These signals are sent to a computer system that generates commands for control units that move the control surfaces. With this type of system, no linkages are present to move the controllers when the autopilot operates.

With this type of system, a backdrive system may also be included. The backdrive system has components that are configured to move the controllers to different positions during the operation of the autopilot to provide the tactile and visual information about the operation of the autopilot through the controllers. The backdrive system includes actuators associated with the controllers. The actuators receive signals from the computer system during operation of the autopilot. These signals cause the actuators to move the controllers in a manner that provides the tactile and visual information that may be desired by the pilot.

Thus, this type of flight control system also provides a capability for the pilot to disengage the autopilot through the pilot moving the controller. The backdrive system detects movement of the controller that is not generated by the autopilot. When this type of movement is detected, the autopilot is turned off, disconnected, or otherwise placed into a state in which the autopilot is not operating to direct movement of the aircraft. In this manner, the pilot of the aircraft regains control of the aircraft.

In some cases, if the backdrive system does not operate as desired, the control may move to a neutral position. This type of movement of the control is detected as the pilot moves the controller in a manner to override the autopilot. As a result, the autopilot stops operating the aircraft, and the pilot has to take over operation of the aircraft. In this manner, when the autopilot becomes unavailable, the workload of the pilot for operating the aircraft is increased. In this manner, the pilot may be unable to perform tasks, such as, for example, navigation, communications, and/or other tasks as desired.

Further, when the pilot operates the aircraft for longer periods of time than expected, the pilot may become fatigued. As a result, additional pilots or crew members may be needed in the aircraft to take into account these types of situations, depending on the mission being performed by the aircraft.

One manner in which this type of situation may be avoided is using additional actuators as back-ups to the actuators used to move the controllers to provide the tactile and visual information. In other words, each actuator in the backdrive system has one or more additional actuators that perform the same function in case the actuator fails to operate as desired. In this manner, redundancy reduces situations in which the autopilot becomes disengaged or stops operating the aircraft.

In this type of system, however, the use of additional actuators and wiring for the additional actuators increases the weight and cost of an aircraft. Also, with additional actuators, more space is needed in the aircraft to accommodate these actuators. Further, additional maintenance may be needed to replace or inspect the actuators. The increased weight, cost, space used, and/or maintenance may be undesirable.

Therefore, it would be advantageous to have a method and apparatus that takes into account at least some of the issues discussed above, as well as possibly other issues.

SUMMARY

In one advantageous embodiment, an apparatus comprises a monitoring module. The monitoring module is configured to identify a difference between measured position information for a controller and expected position information for the controller. The monitoring module is configured to compare the difference with thresholds for managing an autopilot in a control system of a vehicle to form a comparison. The monitoring module is configured to manage an operation of the autopilot based on the comparison such that the autopilot remains operating when a backdrive system is inoperative and an intentional override of the autopilot is absent.

In another advantageous embodiment, a method for managing an autopilot of a vehicle is provided. A difference is identified between measured position information for a controller and expected position information for the controller. The measured position information and the expected position information are compared with thresholds for managing an autopilot in a control system to form a comparison. An operation of the autopilot is managed based on the comparison such that the autopilot remains operating when a backdrive system is inoperative and an intentional override of the autopilot is absent.

In yet another advantageous embodiment, a computer program product comprises a computer readable storage medium, first program code, second program code, and third program code. The first program code is for identifying a difference between measured position information for a controller and expected position information for the controller.

The second program code is for comparing the difference with thresholds for managing an autopilot in a control system of a vehicle to form a comparison. The third program code is for managing an operation of the autopilot based on the comparison such that the autopilot remains operating when a backdrive system is inoperative and an intentional override of the autopilot is absent. The first program code, the second program code, and the third program code are stored on the computer readable storage medium.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood with reference to the following detailed description of an advantageous embodiment of the present disclosure when read in conjunction with the accompanying drawings, wherein:

FIG. 14 is an illustration of a data processing system in accordance with an advantageous embodiment.

DETAILED DESCRIPTION

Figure 1:
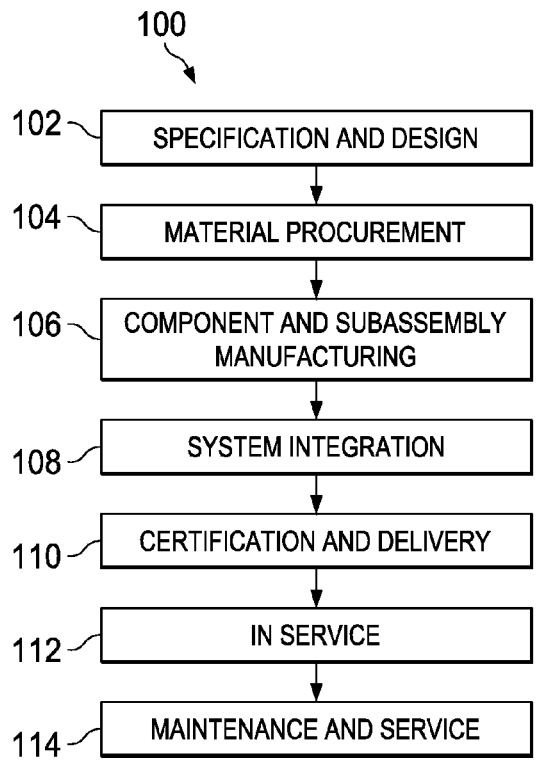
FIG. 1 is an illustration of an aircraft manufacturing and service method in accordance with an advantageous embodiment.
Figure 2:
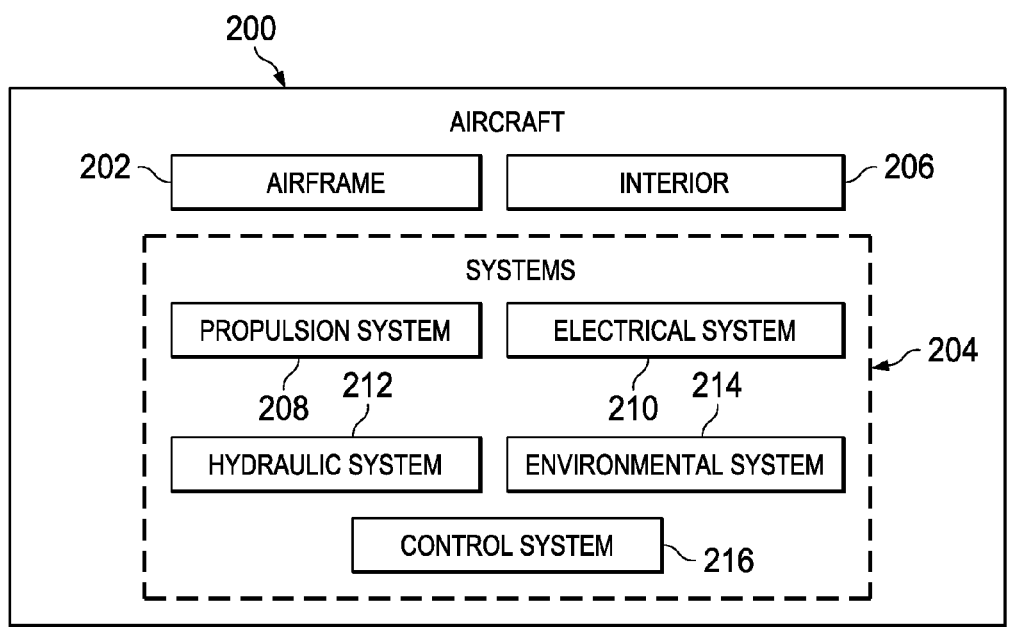
FIG. 2 is an illustration of an aircraft in which an advantageous embodiment may be implemented.

Referring more particularly to the drawings, advantageous embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, rework, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with plurality of systems 204 and interior 206. Examples of plurality of systems 204 include one or more of propulsion system 208, electrical system 210, hydraulic system 212, environmental system 214, and control system 216. Any number of other systems may be included. Although an aerospace example is shown, different advantageous embodiments may be applied to other industries, such as the automotive or maritime industries.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A "number", when referring to items, means "one or more items." For example, a number of apparatus embodiments is one or more apparatus embodiments. A number of apparatus embodiments, method embodiments, or a combination thereof may be added or otherwise utilized while aircraft 200 is in service 112 and/or during maintenance and service 114 in FIG. 1. The use of a number of the different advantageous embodiments may substantially expedite the assembly and/or reduce the cost of aircraft 200. For example, in an advantageous embodiment, control system 216 may be assembled using less actuators or other devices for redundancy in control system 216.

In one advantageous embodiment, a monitoring module may be used or implemented with control system 216. Control system 216 includes components that control the movement of aircraft 200.

In an advantageous embodiment, the monitoring system is configured to identify a difference between measured position information for a controller and expected position information for the controller. The monitoring module is also configured to compare the difference with the thresholds for managing an autopilot in the control system to form a comparison and manage an operation of the autopilot based on the comparison such that the autopilot remains operating when the backdrive system is inoperative and an intentional override of the autopilot is absent. The process also may be used to manage the backdrive system, if desired.

Figure 3:
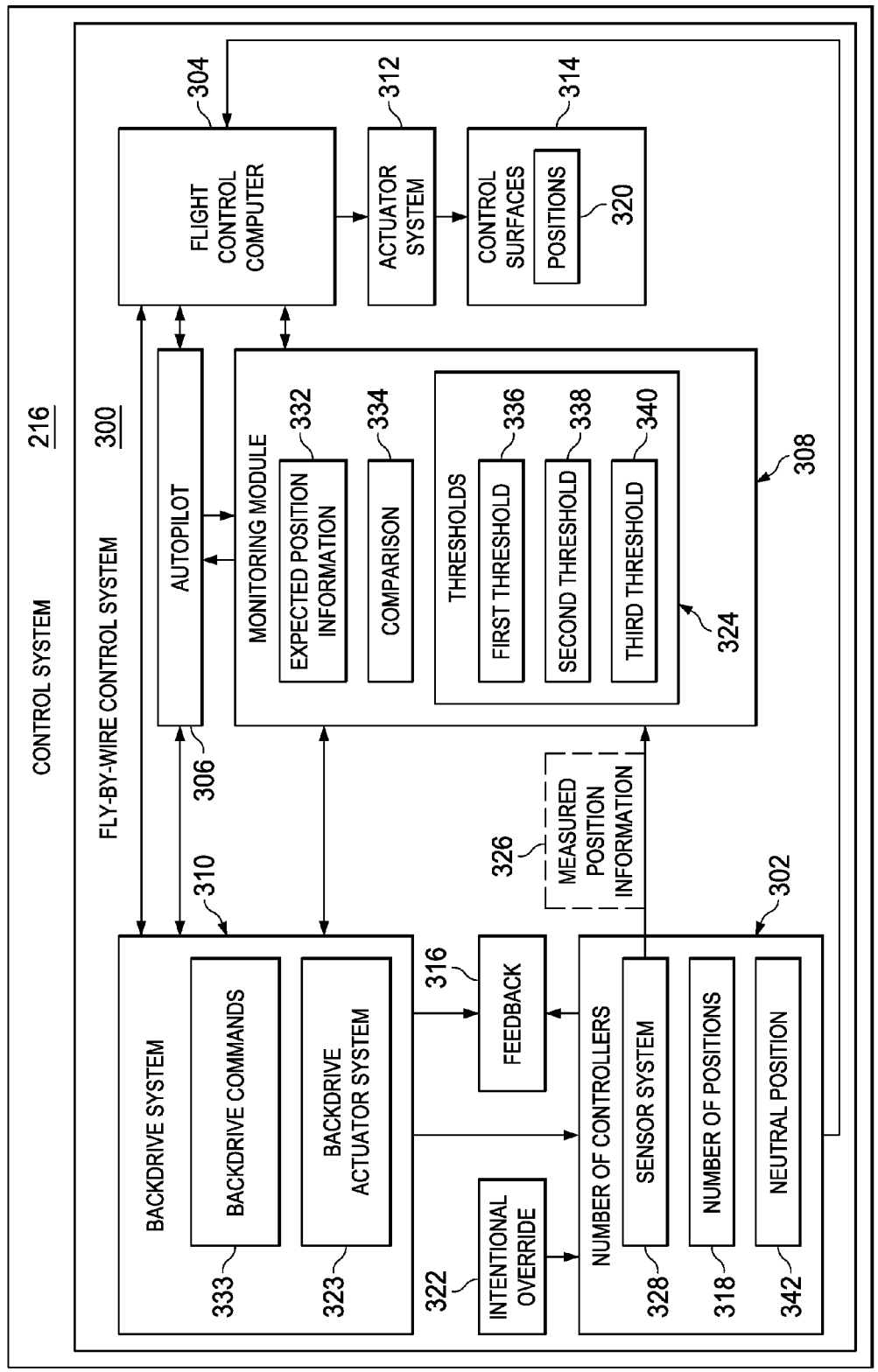
FIG. 3 is an illustration of a block diagram of a control system in accordance with an advantageous embodiment.

With reference now to FIG. 3, an illustration of a block diagram for a control system is depicted in accordance with an advantageous embodiment. In this illustrative example, control system 216 for aircraft 200 in FIG. 2 is shown in more detail. In this illustrative example, control system 216 takes the form of fly-by-wire control system 300. Control system 216 includes components used to control the movement of aircraft 200 in FIG. 2 when aircraft 200 moves on the ground, in the air, or both.

In this illustrative example, control system 216 comprises number of controllers 302, flight control computer 304, autopilot 306, monitoring module 308, backdrive system 310, actuator system 312, and control surfaces 314.

Number of controllers 302 includes hardware devices used by an operator of aircraft 200 to control aircraft 200 in FIG. 2. Number of controllers 302 may include, for example, without limitation, at least one of a column, a wheel, a flight stick, a lever, a throttle lever, a control yoke, pedals, and/or other suitable types of controllers. In these illustrative examples, number of controllers 302 may be manipulated by an operator of aircraft 200, such as a pilot or co-pilot. For example, number of controllers 302 may be manipulated by at least one of moving, applying pressure to, turning, and/or manipulating in some other suitable manner one or more of number of controllers 302.

Manipulation of number of controllers 302 generates signals that are sent to flight control computer 304. Flight control computer 304 generates commands using these signals to move control surfaces 314 to different positions. These commands are sent to actuator system 312, which is configured to control the movement of control surfaces 314. As used herein, a "number of items" means "one or more items."

In these illustrative examples, autopilot 306 operates to control the movement of control surfaces 314. Autopilot 306 may control movement of control surfaces 314 without requiring a pilot or other operator of aircraft 200 to provide input. As a result, autopilot 306 may allow operators of aircraft 200 to perform other operations or rest during the flight of aircraft 200.

In one illustrative example, autopilot 306 sends commands to flight control computer 304, which in turn sends commands to actuator system 312 to operate actuator system 312. In particular, actuator system 312 is operated to move control surfaces 314 into positions 320 without requiring input from an operator of aircraft 200.

In these illustrative examples, backdrive system 310 is connected to number of controllers 302 and autopilot 306. In particular, backdrive system 310 is electrically connected to autopilot 306. As used herein, when a first component, such as backdrive system 310, is electrically connected to a second component, such as autopilot 306, the first component is connected to the second component such that an electrical signal can be sent from the first component to the second component, the second component to the first component, or a combination of the two.

The first component may be electrically connected to the second component without any additional components between the two components. The first component may also be electrically connected to the second component by one or more other components. For example, one electronic device may be electrically connected to a second electronic device without any additional electronic devices between the first electronic device and the second electronic device. In some cases, another electronic device may be present between the two electronic devices that are electrically connected to each other. For example, backdrive system 310 may be connected to autopilot 306 through flight control computer 304.

In these illustrative examples, backdrive system 310 provides feedback 316 for the operations performed by autopilot 306 to operators of aircraft 200. Feedback 316 may be visual and/or tactile feedback. In other words, backdrive system 310 provides an operator of aircraft 200 with visual and/or tactile awareness of the operations being performed by autopilot 306.

When autopilot 306 is operating, autopilot 306 or flight control computer 304 sends input to backdrive system 310 to operate backdrive system 310. During operation of backdrive system 310, backdrive system 310 generates backdrive commands 333 to control backdrive actuator system 323 in backdrive system 310. Backdrive commands 333 are generated based on positions 320 to which control surfaces 314 are moved.

Backdrive actuator system 323 is connected to number of controllers 302. Operation of backdrive actuator system 323 occurs in response to backdrive commands 333 to manipulate number of controllers 302. For example, backdrive commands 333 may cause backdrive actuator system 323 to move number of controllers 302 to number of positions 318 that correspond to positions 320 for control surfaces 314. In this manner, number of positions 318 of number of controllers 302 may be controlled by backdrive system 310 in response to autopilot 306 moving control surfaces 314 into positions 320 using actuator system 312.

In other words, backdrive system 310 moves number of controllers 302 into number of positions 318 corresponding to positions 320 for control surfaces 314. This movement is similar to the manner in which a pilot may move number of controllers 302 to number of positions 318 to move control surfaces 314 into positions 320. In this manner, backdrive system 310 moves number of controllers 302 into number of positions 318 to provide feedback 316 that is visual and/or tactile for positions 320 of control surfaces 314. Feedback 316 provides an operator of the aircraft an awareness of the operations being performed by autopilot 306.

In these illustrative examples, monitoring module 308 is configured to determine when intentional override 322 of autopilot 306 occurs. Monitoring module 308 may take the form of software, hardware, or both. When monitoring module 308 takes the form of software, the program code for the software may be run on a computer, such as, for example, flight control computer 304. When monitoring module 308 takes the form of hardware, the hardware component may be located in flight control computer 304 or in a separate unit.

Intentional override 322 means that the pilot or another operator of aircraft 200 has moved one or more controllers in number of controllers 302 in a manner that is intended to override autopilot 306. In other words, intentional override 322 means that the pilot intends to take control of aircraft 200 and does not want autopilot 306 controlling movement of aircraft 200.

Monitoring module 308 allows the detection of intentional override 322 even when backdrive system 310 is not operating or, in other words, is inoperative. Backdrive system 310 may be inoperative for a number of different reasons. For example, backdrive system 310 may not operate as desired, may be turned off, or may not operate for some other reason.

Monitoring module 308 is configured to manage operation of autopilot 306, backdrive system 310, or both autopilot 306 and backdrive system 310 in these illustrative examples. Monitoring module 308 uses thresholds 324 in managing autopilot 306 and backdrive system 310.

In these illustrative examples, monitoring module 308 receives measured position information 326 from sensor system 328. Sensor system 328 is associated with number of controllers 302 in these depicted examples.

Sensor system 328 generates measured position information 326 as number of controllers 302 move to number of positions 318. Measured position information 326 may be for one, some, or a portion of number of controllers 302. Measured position information 326 may include, for example, at least one of a position, a velocity, a vector, a direction of movement, and other suitable parameters for a controller.

Additionally, monitoring module 308 identifies expected position information 332 for number of controllers 302. Expected position information 332 includes expected values for parameters, such as, for example, at least one of a position, a velocity, a vector, a direction of movement, and other suitable parameters for a controller.

In these examples, monitoring module 308 identifies expected position information 332 using backdrive commands 333 received from backdrive system 310. In some cases, monitoring module 308 may generate expected position information 332 from backdrive commands 333 by using backdrive commands 333 to adjust measured position information 326 in some illustrative examples.

In these illustrative examples, monitoring module 308 compares measured position information 326 and expected position information 332 to form comparison 334. Monitoring module 308 uses comparison 334 to determine whether a difference between measured position information 326 and expected position information 332 is greater than thresholds 324 for managing autopilot 306 and backdrive system 310.

Monitoring module 308 manages the operation of autopilot 306 and backdrive system 310 based on comparison 334. This management is such that autopilot 306 remains operating when backdrive system 310 is not operating and intentional override 322 of autopilot 306 is absent. In particular, thresholds 324 are selected such that autopilot 306 remains operating when backdrive system 310 is not operating and intentional override 322 of autopilot 306 is absent.

In these illustrative examples, thresholds 324 includes first threshold 336, second threshold 338, and third threshold 340. First threshold 336 is configured to detect when backdrive system 310 is not operating as desired when autopilot 306 is operating. Second threshold 338 is configured to detect intentional override 322 of autopilot 306 when autopilot 306 and backdrive system 310 are operating. Third threshold 340 is configured to detect intentional override 322 of autopilot 306 when backdrive system 310 is not operating.

In these illustrative examples, backdrive system 310 may be disabled when comparison 334 is greater than first threshold 336. However, comparison 334 exceeding first threshold 336 alone does not cause autopilot 306 to stop operating.

When comparison 334 exceeds second threshold 338 while backdrive system 310 is operating, autopilot 306 may be disengaged. In these illustrative examples, first threshold 336 and second threshold 338 are selected such that comparison 334 exceeds first threshold 336 prior to exceeding second threshold 338. In other words, backdrive system 310 may be disabled prior to second threshold 338 being exceeded.

In this manner, second threshold 338 may be configured to be active when backdrive system 310 is operating or when backdrive system 310 has been operating for a selected period of time prior to second threshold 338 being exceeded. Second threshold 338 may be set higher than first threshold 336 such that actual occurrences of backdrive system 310 not operating as desired may be detected without disengaging autopilot 306.

Further, in these illustrative examples, second threshold 338 is selected to be large enough such that autopilot 306 is not unintentionally disconnected and yet small enough such that intentional override 322 may be detected. Additionally, third threshold 340 is selected to be large enough so that autopilot 306 is not unintentionally disconnected and yet small enough so that intentional override 322 may be detected.

In these examples, third threshold 340 may be selected such that autopilot 306 may be disengaged in response to intentional override 322 regardless of whether backdrive system 310 is operating or not operating. Further, when the status of backdrive system 310 is not taken into account with third threshold 340, third threshold 340 is set higher than both first threshold 336 and second threshold 338. In some cases, when the status of backdrive system 310 is not taken into account, third threshold 340 may be set to a value that is substantially equal to second threshold 338. When the status of backdrive system 310 is taken into account, third threshold 340 may be set to any value that provides the desired type of override of autopilot 306.

In this manner, thresholds 324 are selected such that autopilot 306 stops operating within a desired period of time after intentional override 322 occurs and such that the possibility of an unintentional override of autopilot 306 is reduced, regardless of whether backdrive system 310 is operating or not operating. Further, thresholds 324 are selected such that autopilot 306 may remain engaged or operating even though backdrive system 310 may not operate as desired.

Control surfaces 314 may be moved into positions 320 that correspond to a current number of positions for number of controllers 302 when autopilot 306 stops operating. This movement of control surfaces 314 may occur as soon as autopilot 306 stops operating in these examples. When autopilot 306 disengages, autopilot 306 may be considered to have stopped operating.

In one illustrative example, when thresholds 324 are set too high, number of controllers 302 may have to be moved a greater distance by an operator of aircraft 200 before intentional override 322 is detected and autopilot 306 is disengaged. In this illustrative example, an undesired change to the position and/or orientation of aircraft 200 may occur when control surfaces 314 begin responding to the positions of number of controllers 302 when autopilot 306 is disengaged.

In these illustrative examples, when backdrive system 310 is not operating, one or more of number of controllers 302 returns to neutral position 342. Neutral position 342 is a position for number of controllers 302 that is expected when backdrive system 310 is inoperative. Backdrive system 310 is inoperative, in these examples, when backdrive system 310 is turned off, disengaged, disconnected from number of controllers 302, or not operating as desired.

The illustration of components for control system 216 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, although monitoring module 308 is shown as a separate component in the block diagram, monitoring module 308 may be implemented as part of one or more other components. For example, monitoring module 308 may be implemented in flight control computer 304, as part of autopilot 306, or even as part of backdrive system 310 in other illustrative examples.

In another illustrative example, an advantageous embodiment may be implemented with other types of vehicles other than aircraft 200. For example, an advantageous embodiment may be implemented in an automobile, a tank, a personnel carrier, a submarine, a ship, a spacecraft, and/or other suitable types of vehicles.

In still another illustrative example, sensor system 328 may be considered to be part of another system rather than number of controllers 302. For example, sensor system 328 may identify number of positions 318 for number of controllers 302, but may be considered to be part of another system, such as, for example, backdrive system 310.

Figure 4:
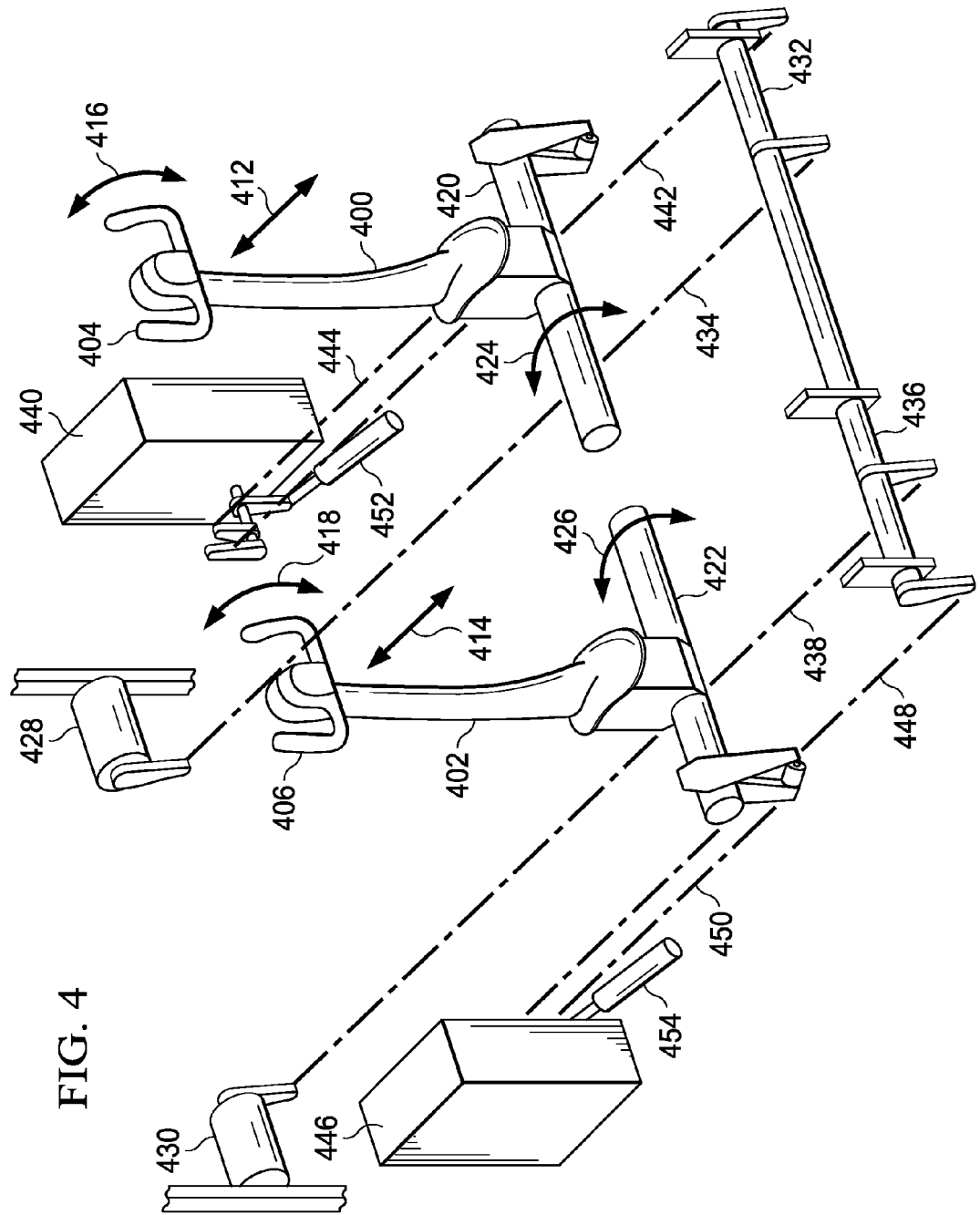
FIG. 4 is an illustration of controllers in a control system in accordance with an advantageous embodiment.

With reference now to FIG. 4, an illustration of controllers in a control system is depicted in accordance with an advantageous embodiment. In this illustrative example, column 400 and column 402 are examples of controllers in number of controllers 302 in FIG. 3. In this example, wheel 404 is connected to column 400, and wheel 406 is connected to column 402. Wheel 404 and wheel 406 are also examples of controllers in number of controllers 302. This example, however, focuses on column 400 and column 402.

As can be seen, column 400 and column 402 are located side by side. Column 400 and column 402 are moveable in the direction of arrows 412 and 414, respectively. Wheel 404 and wheel 406 are rotatable at the end of column 400 and column 402 in the direction of arrows 416 and 418, respectively. Column 400 is rotatably mounted on shaft 420, and column 402 is rotatably mounted on shaft 422. Shaft 420 and shaft 422 are rotatable in the direction of arrows 424 and 426 when column 400 and column 402 are moved in the direction of arrows 412 and 414.

In this illustrative example, actuator 428 is connected to shaft 432 by rod 434. In a similar fashion, actuator 430 is connected to shaft 436 by rod 438. Actuator 428 and actuator 430 are examples of actuators located within backdrive actuator system 323 in FIG. 3.

As depicted, shaft 432 is connected to centering unit 440 by rod 442 and, in turn, centering unit 440 is connected to shaft 420 for column 400 by rod 444. In a similar fashion, shaft 436 is connected to centering unit 446 by rod 448 and, in turn, centering unit 446 is connected to shaft 422 for column 402 by rod 450.

In these illustrative examples, actuator 428 and actuator 430 are controlled to move column 400 and column 402 in a manner that provides visual and tactile feedback to a pilot. Actuator 428 may operate such that the interconnection with the shaft and rods cause column 400 and column 402 to move in the direction of arrow 412. In a similar fashion, actuator 430 may operate such that the interconnection with the different rods and shafts causes column 402 to move in the direction of arrow 414. Centering unit 440 and centering unit 446 causes column 400 and column 402 to move to a neutral position when actuator 428 and actuator 430 are not operating to control the position of column 400 and column 402.

In these illustrative examples, the positions of column 400 and column 402 may be detected or identified by sensor 452 and sensor 454. Sensor 452 is associated with column 400 and sensor 454 is associated with column 402. These sensors are indirectly connected to the column by the linkages and shafts such that movement of the linkages and shafts causes movement that is detected by sensor 452 and sensor 454. These sensors may generate data for measured position information 326 in FIG. 3.

The illustration of column 400 and column 402 is not meant to imply physical or architectural limitations to the manner in which different controllers may be implemented or controlled by backdrive systems. For example, in some illustrative examples, actuators may be connected to wheel 404 and wheel 406. Further, in other illustrative examples, the controllers may take the form of pedals, sidesticks, and/or other types of controllers used to operate an aircraft. The different components illustrated in FIG. 4 may be used in combination with components depicted in control system 216 in FIG. 3. Some of these components are examples of physical implementations of blocks within control system 216 as depicted in FIG. 3.

Figure 5:
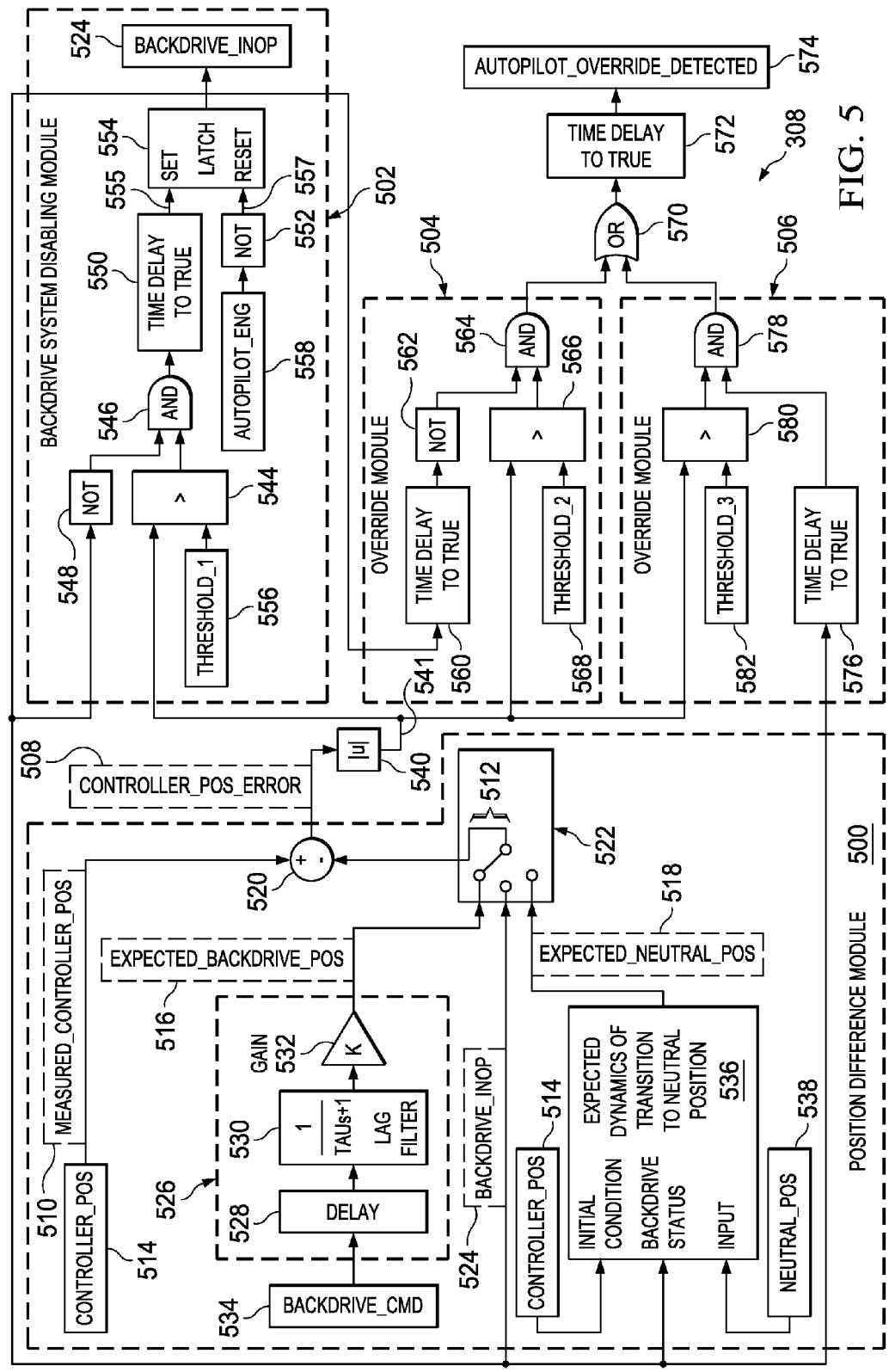
FIG. 5 is an illustration of components in a monitoring module in accordance with an advantageous embodiment.

With reference now to FIG. 5, an illustration of components in a monitoring module is depicted in accordance with an advantageous embodiment. In this illustrative example, an example of an implementation for monitoring module 308 in FIG. 3 is depicted in accordance with an advantageous embodiment.

In this illustrative example, monitoring module 308 includes position difference module 500, backdrive system disabling module 502, override module 504, and override module 506. As depicted, position difference module 500 generates difference 508 between measured position 510 and expected position 512. In particular, difference 508 is generated by subtraction unit 520. Subtraction unit 520 subtracts expected position 512 from measured position 510 in these illustrative examples.

In this illustrative example, measured position 510 is an example of one implementation for measured position information 326 in FIG. 3. Further, expected position 512 is an example of one implementation for expected position information 332 in FIG. 3 in this illustrative example.

As depicted, measured position 510 takes the form of controller position 514. Controller position 514 may be for a controller, such as a controller in number of controllers 302 in FIG. 3. In particular, measured position 510 takes the form of a continuous signal indicating a distance between a current position of the controller and a zero position for the controller. This distance may be in units of, for example, degrees, inches, and/or some other suitable type of unit measurement.

In this illustrative example, the zero position for the controller may be, for example, an initial position for the controller prior to a flight of the aircraft, a position corresponding to a deflection of substantially zero degrees for control surfaces for the aircraft, and/or some other suitable position from which movement of the controller may be measured or quantified.

As illustrated, expected position 512 is selected from one of expected backdrive position 516 and expected neutral position 518. In particular, switch 522 selects between expected backdrive position 516 and expected neutral position 518. This selection is made using backdrive inoperative signal 524. Backdrive inoperative signal 524 is generated by backdrive system disabling module 502 to indicate whether the backdrive system is operating or not operating.

In this illustrative example, backdrive inoperative signal 524 is true or a logic "1" when the backdrive system is not operating and should be disabled. The signal is false or a logic "0" when the backdrive system is operating and should not be disabled. In these examples, when the backdrive system is operating as desired, backdrive inoperative signal 524 does not indicate that the backdrive system should be disabled. This signal is used to send commands to backdrive system 310 in FIG. 3.

Switch 522 uses backdrive inoperative signal 524 to select between expected backdrive position 516 and expected neutral position 518. When backdrive inoperative signal 524 indicates that the backdrive should be disabled, switch 522 selects expected neutral position 518 to output from switch 522. When backdrive inoperative signal 524 indicates that the backdrive system should not be disabled, switch 522 selects expected backdrive position 516 to output from switch 522.

In these illustrative examples, expected backdrive position 516 is generated using backdrive model 526 in position difference module 500. As depicted, backdrive model 526 comprises delay 528, lag filter 530, and gain 532. Backdrive command 534 is input into backdrive model 526 to generate expected backdrive position 516. Backdrive command 534 is the command sent to backdrive actuator system 323 in FIG. 3.

In these illustrative examples, expected neutral position 518 is generated by neutral position model 536. Controller position 514, backdrive inoperative signal 524, and neutral position 538 are sent as inputs into neutral position model 536. Controller position 514 provides an initial condition for neutral position model 536. Backdrive inoperative signal 524 indicates a status of the backdrive system for use by neutral position model 536. Neutral position 538 is a position to which the controller is expected to return when the backdrive system is disabled.

In these illustrative examples, when backdrive inoperative signal 524 indicates that the backdrive system should not be disabled, neutral position model 536 is initialized to be the current measured position for the controller as indicated by controller position 514. Controller position 514 and neutral position 538 are used to identify expected neutral position 518. In other words, expected neutral position 518 may not be the final position or neutral position 538 for the controller.

For example, neutral position model 536 may use an expected rate of movement of the controller from controller position 514 to neutral position 538 at the time backdrive inoperative signal 524 indicates that the backdrive system should be disabled to identify expected neutral position 518. In other words, expected neutral position 518 may be the position at which the controller is expected to be at a current point in time while moving towards neutral position 538 when the backdrive system is not operating. In this manner, expected neutral position 518 may be neutral position 538 or some position between neutral position 538 and controller position 514 based on the processing of controller position 514 and neutral position 538 by neutral position model 536.

In these illustrative examples, difference 508 has a positive value or a negative value based on output from subtraction unit 520. In these illustrative examples, only the magnitude of difference 508 is needed. In these depicted examples, absolute value unit 540 generates absolute difference 541. Absolute difference 541 is difference 508 without a sign.

In this illustrative example, backdrive system disabling module 502 includes comparator 544, AND gate 546, inverter 548, delay unit 550, inverter 552, and latch 554. Absolute difference 541 is input into backdrive system disabling module 502 at comparator 544. Absolute difference 541 is compared against first threshold 556 by comparator 544. A logic "1" is output by comparator 544 if absolute difference 541 is greater than first threshold 556. This output from comparator 544 is connected to AND gate 546 along with the output of inverter 548.

The output of AND gate 546 is sent through delay unit 550. In turn, the output of delay unit 550 is sent as an input into latch 554. Further, in this example, autopilot engaged signal 558 is sent through inverter 552, with the output of inverter 552 also being sent as an input into latch 554. Latch 554 outputs backdrive inoperative signal 524. The output of delay unit 550 forms set input 555 for latch 554. This output of inverter 552 forms reset input 557 for latch 554.

In this illustrative example, latch 554 generates a true or logic "1" for backdrive inoperative signal 524 when set input 555 is true and reset input 557 is false. If set input 555 is false and reset input 557 is true, latch 554 generates a false or logic "0" for backdrive inoperative signal 524. If both set input 555 and reset input 557 are false, latch 554 generates backdrive inoperative signal 524 maintaining its previously-identified value.

Further, if both set input 555 and reset input 557 are true, latch 554 may be configured to determine whether to use set input 555 or reset input 557 for outputting backdrive inoperative signal 524.

Backdrive inoperative signal 524 is output by latch 554 and is sent back into backdrive system disabling module 502 at inverter 548. These connections form a feedback loop in backdrive system disabling module 502.

In this manner, if the backdrive system has not previously been identified as being disabled by backdrive inoperative signal 524, backdrive system disabling module 502 identifies the backdrive system as being disabled using backdrive inoperative signal 524 when the autopilot is engaged and when the absolute value of difference 508 is greater than first threshold 556 for at least a period of time, as defined by delay unit 550.

As depicted, override module 504 comprises delay unit 560, inverter 562, AND gate 564, and comparator 566. In this example, backdrive inoperative signal 524 from the output of backdrive system disabling module 502 is input into delay unit 560. The output of delay unit 560 is connected to inverter 562. In turn, the output of inverter 562 is connected to AND gate 564.

In this illustrative example, absolute difference 541 is input into override module 504 at an input to comparator 566 in override module 504. Absolute difference 541 is compared to second threshold 568 by comparator 566. Comparator 566 outputs a true or logic "1" when absolute difference 541 is greater than second threshold 568. This output from comparator 566 is sent to AND gate 564. In turn, the output from AND gate 564 is sent to OR gate 570, which in turn is connected to delay unit 572. The output of delay unit 572 is override signal 574. In this example, override signal 574 is true or logic "1" when an intentional override of the autopilot has been detected.

As depicted, override module 506 comprises delay unit 576, AND gate 578, and comparator 580. Override module 506 receives backdrive inoperative signal 524 from backdrive system disabling module 502 as an input to delay unit 576. Additionally, override module 506 receives absolute difference 541 as an input to comparator 580. Absolute difference 541 is compared to third threshold 582 by comparator 580. Comparator 580 outputs a true or logic "1" if absolute difference 541 is greater than third threshold 582.

The output from comparator 580 and the output from delay unit 576 are sent to AND gate 578. In turn, the output from AND gate 578 is sent into OR gate 570 along with the output from AND gate 564.

In these illustrative examples, a logic "1" for a signal or a logic "0" for a signal means that the voltage level for the signal has a value of "1" or "0", respectively. For signals having an output other than a logic "1" or logic "0", the voltage levels for these signals may have other values.

The illustration of components for monitoring module 308 in FIG. 5 is not meant to imply limitations to the manner in which monitoring module 308 may be implemented. For example, other types of logic may be used in addition to and/or in place of the logic depicted in the module in FIG. 5.

In some illustrative examples, the processing performed within backdrive model 526, neutral position model 536, and switch 522 may be performed within a single model with inputs, including backdrive command 534, controller position 514, neutral position 538, and backdrive inoperative signal 524, and an output of expected position 512.

As another illustrative example, the output of AND gate 564 may be sent into a first time delay unit, while the output of AND gate 578 is sent into a second time delay unit. The outputs of these two time delay units may then be applied to an OR gate, which in turn would output override signal 574. In this manner, different values of time delays may be present for the outputs of override module 504 and override module 506, as compared to the single time delay provided by delay unit 572.

Further, monitoring module 308 may be implemented using software. With this type of implementation, the logic components in FIG. 5 may be converted into code for a software program. In yet other illustrative examples, a portion of monitoring module 308 may be implemented using hardware based on the logic from FIG. 5, while other portions of monitoring module 308 may be implemented in software that performs the functions of the logic illustrated in FIG. 5.

Figure 6:
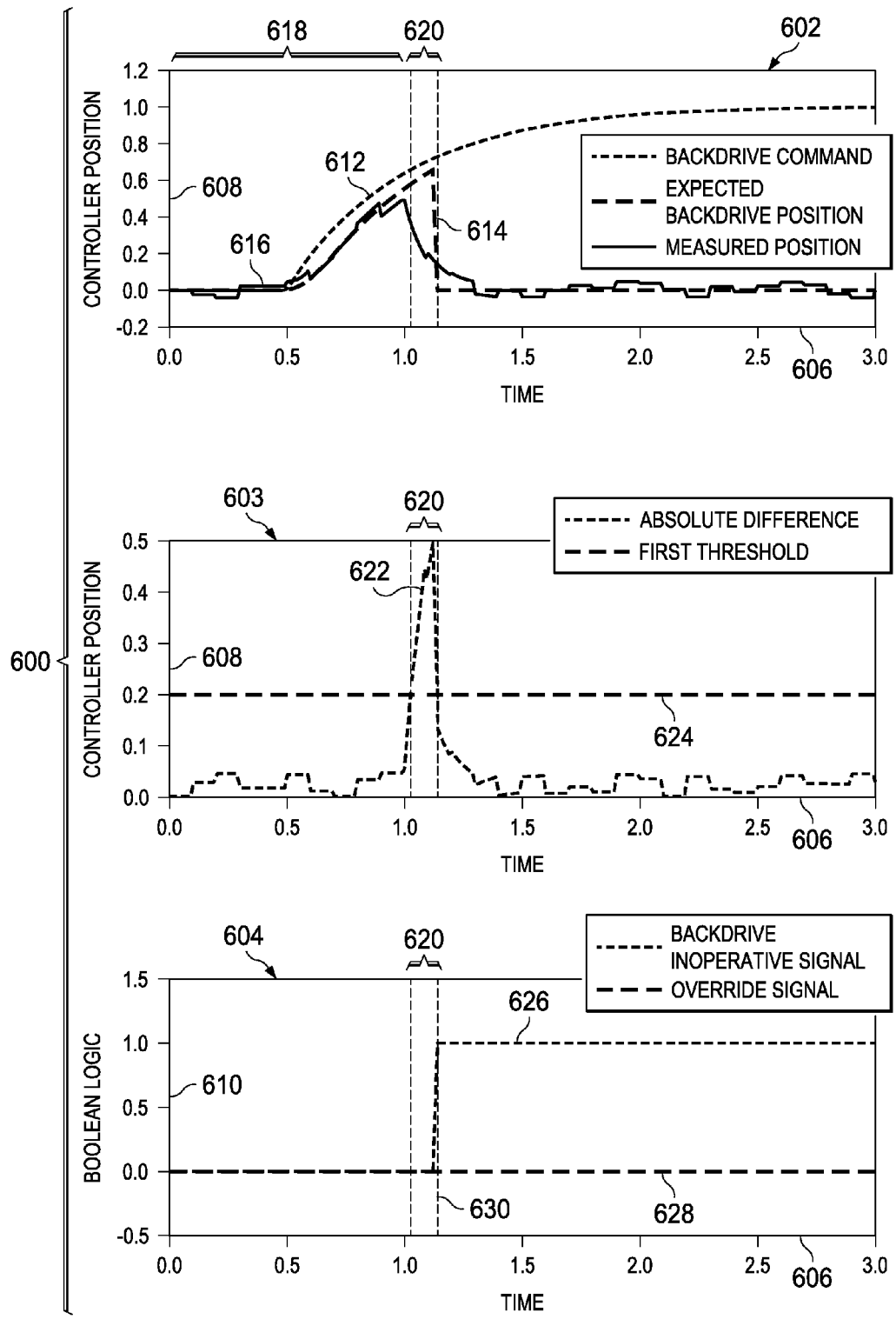
FIG. 6 is an illustration of a set of timing diagrams corresponding to different thresholds being exceeded in accordance with an advantageous embodiment.
Figure 7:
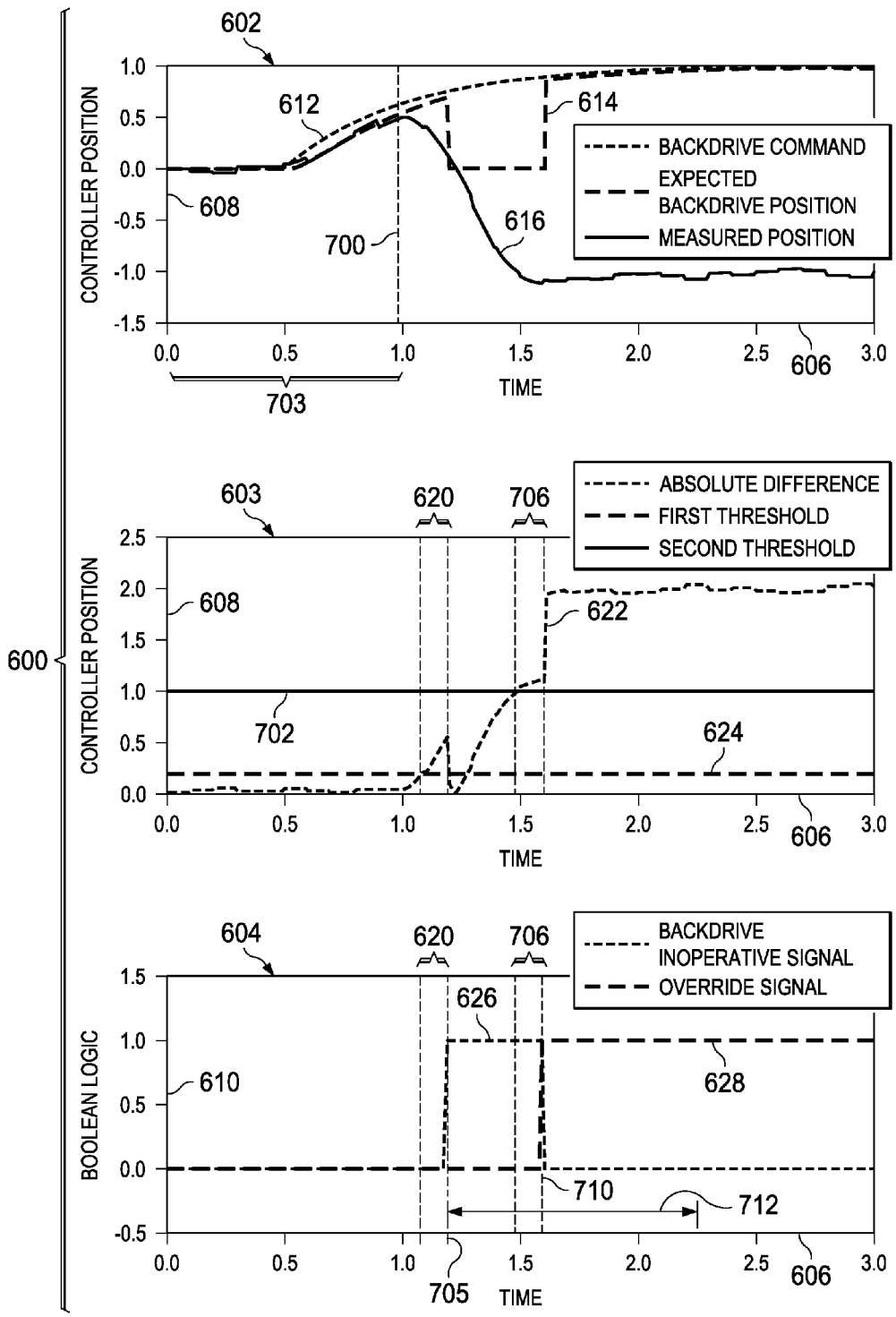
FIG. 7 is an illustration of a set of timing diagrams corresponding to different thresholds being exceeded in accordance with an advantageous embodiment.
Figure 8:
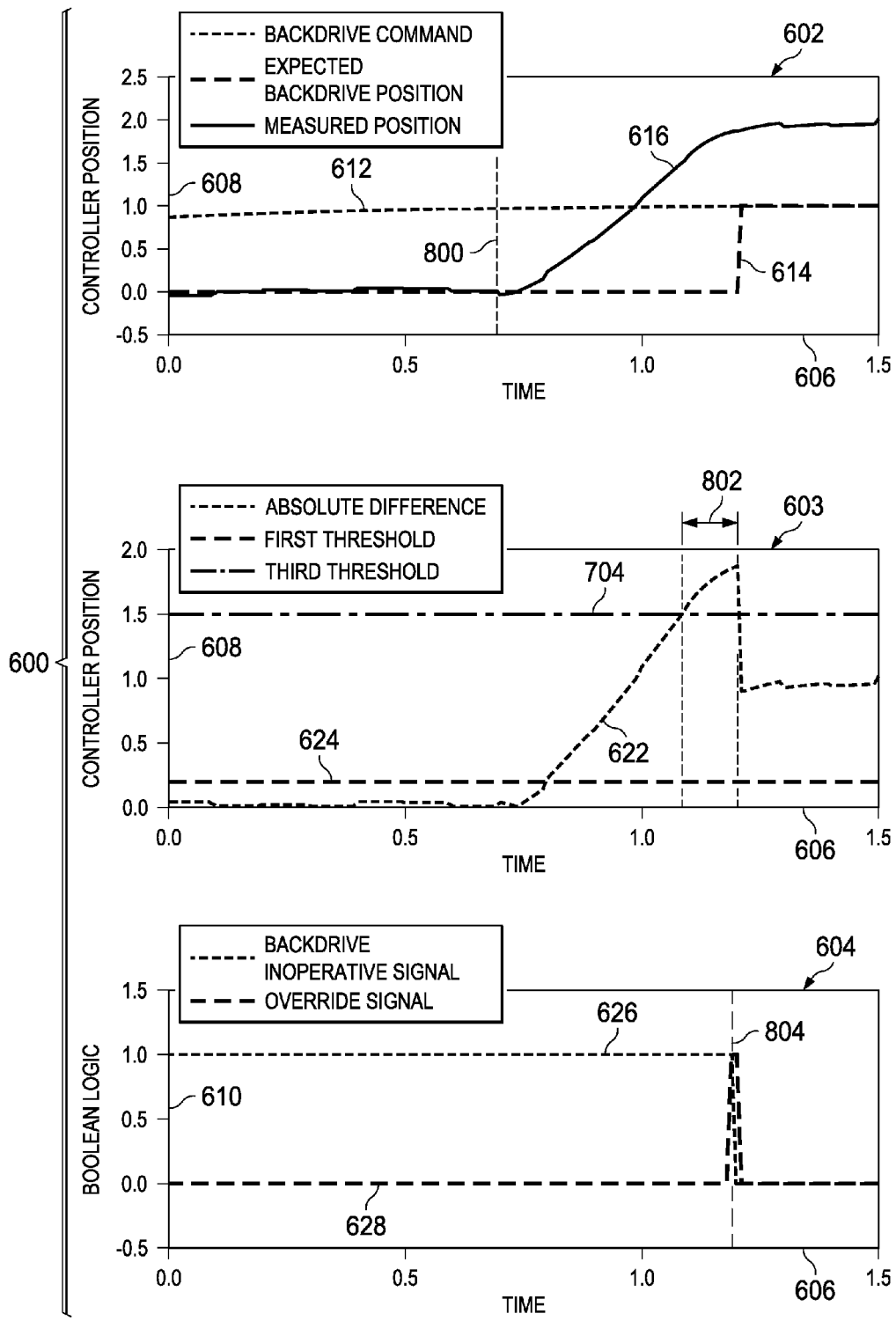
FIG. 8 is an illustration of a set of timing diagrams corresponding to different thresholds being exceeded in accordance with an advantageous embodiment.

With reference now to FIGS. 6-8, illustrations of a set of timing diagrams corresponding to different thresholds being exceeded is depicted in accordance with an advantageous embodiment. Set of timing diagrams 600 in FIGS. 6-8 illustrates operation of monitoring module 308 implemented using components as depicted in FIG. 5.

Turning now to FIG. 6, set of timing diagrams 600 presents a situation in which the backdrive system is not operating as desired. As depicted, set of timing diagrams 600 includes timing diagram 602, timing diagram 603, and timing diagram 604. Timing diagram 602, timing diagram 603, and timing diagram 604 have horizontal axis 606. Timing diagram 602 and timing diagram 603 have vertical axis 608. Timing diagram 604 has vertical axis 610.

In these illustrative examples, horizontal axis 606 is time. Vertical axis 608 for timing diagram 602 and timing diagram 603 is controller position 514 from FIG. 5. Vertical axis 610 for timing diagram 604 is Boolean logic. In other words, values for curves in timing diagram 604 may be selected from one of logic "1" and logic "0".

Timing diagram 602 includes curve 612, curve 614, and curve 616. Curve 612 is backdrive command 534, curve 614 is expected backdrive position 516, and curve 616 is measured position 510 in FIG. 5. First period of time 618 is the period of time during which the backdrive system is operating as desired. First period of time 618 ends when curve 616 suddenly begins moving away from curve 614.

Second period of time 620 is the period of time during which absolute difference 541 in FIG. 5 needs to be continuously greater than first threshold 556 while the backdrive system is not operating as desired for the backdrive system to be identified as not operating. Second period of time 620 is defined by delay unit 550 in FIG. 5.

Timing diagram 603 includes curve 622 and curve 624. Curve 622 is absolute difference 541, while curve 624 is first threshold 556 in FIG. 5. As depicted, values for curve 622 are continuously greater than values for curve 624 for second period of time 620 defined by delay unit 550.

In this illustrative example, timing diagram 604 includes curve 626 and curve 628. Curve 626 is backdrive inoperative signal 524, and curve 628 is override signal 574. As illustrated, curve 626 changes from logic "0" to logic "1" at time 630. In other words, backdrive inoperative signal 524 indicates that the backdrive system is not operating as desired and should be disabled at time 630. Time 630 occurs at the end of second period of time 620.

As depicted, the backdrive system is identified as not operating as desired, but autopilot is not disconnected or disengaged.

With reference now to FIG. 7, set of timing diagrams 600 presents a situation in which an intentional override of the autopilot is detected while the backdrive system is operating as desired. In this illustrative example, time 700 on timing diagram 602 is the time at which an operator attempts to gain manual control of the aircraft. For example, an operator may attempt to gain manual control of the aircraft by moving a controller at time 700.

As depicted in timing diagram 602, the backdrive system is operating as desired during first period of time 703. First period of time 703 ends when curve 616 suddenly begins moving away from curve 614.

In timing diagram 603, second period of time 620 begins when curve 622 is greater than curve 624. Second period of time of time 620 is the period of time during which curve 622 is continuously greater than curve 624 such that the backdrive system is identified as not operating as desired. Second period of time 620 ends at time 705 in timing diagram 604. Time 705 is the time at which a value for curve 626 changes to logic "1".

In this illustrative example, timing diagram 603 has curve 702 in addition to curve 622 and curve 624. Curve 702 is second threshold 568 in FIG. 5. Third period of time 706 is the period of time during which curve 626 has a value of logic "1" and curve 622 is greater than curve 702. Further, third period of time 706 is a period of time within fourth period of time 712 during which curve 622 is greater than curve 702. Fourth period of time 712 begins at time 705.

In this depicted example, fourth period of time 712 is defined by delay unit 560 in FIG. 5. Fourth period of time 712 is the period of time during which curve 622 needs to be greater than curve 702 for the amount of time defined by delay unit 572 in FIG. 5 for override module 504 to detect an intentional override. In this illustrative example, the period of time defined by delay unit 572 in FIG. 5 is third period of time 706.

In other words, absolute difference 541 needs to be continuously greater than second threshold 568 for third period of time 706 within fourth period of time 712 for override module 504 to detect an intentional override. Third period of time 706 ends at time 710.

As depicted in timing diagram 604, an intentional override of the autopilot is detected at time 710 at the end of third period of time 706. In particular, the value for override signal 574 changes to a logic "1" at time 710. Further, at time 710, when the intentional override of the autopilot is detected, monitoring module 308 stops monitoring the backdrive system until the autopilot begins operating again.

With reference now to FIG. 8, set of timing diagrams 600 presents a situation in which an intentional override of the autopilot is detected while the backdrive system is not operational. In this illustrative example, time 800 is the time at which an operator attempts to gain manual control of the aircraft. For example, an operator may attempt to gain manual control of the aircraft by moving a controller at time 800.

In this illustrative example, the backdrive system has been identified as not operating. In other words, backdrive inoperative signal 524 has a value of logic "1", as seen with curve 626 in timing diagram 604.

As depicted, fifth period of time 802 in timing diagram 603 is the time during which absolute difference 541 needs to be greater than third threshold 582 in FIG. 6 for an intentional override of the autopilot to be detected when the backdrive system has been identified as not operating. Time 804 in timing diagram 604 is the time at which the intentional override of the autopilot is detected. As illustrated, when an intentional override of the autopilot is detected, monitoring module 308 may stop monitoring the backdrive system until the autopilot begins operating again.

The illustrations of timing diagrams 602, 603, and 604 in FIGS. 6-8 are not meant to imply limitations to the manner in which an advantageous embodiment may be implemented. Other components in addition to and/or in place of the ones illustrated may be used. For example, in other illustrative examples, the amounts of time within first period of time 618, second period of time 620, first period of time 703, third period of time 706, and/or fourth period of time 712 may vary, depending on the particular implementation. Further, in some illustrative examples, first threshold 556, second threshold 568, and/or third threshold 582 from FIG. 5 may have different values such that the times and/or periods of time indicated in timing diagrams 602, 603, and 604 are different.

Figure 9:
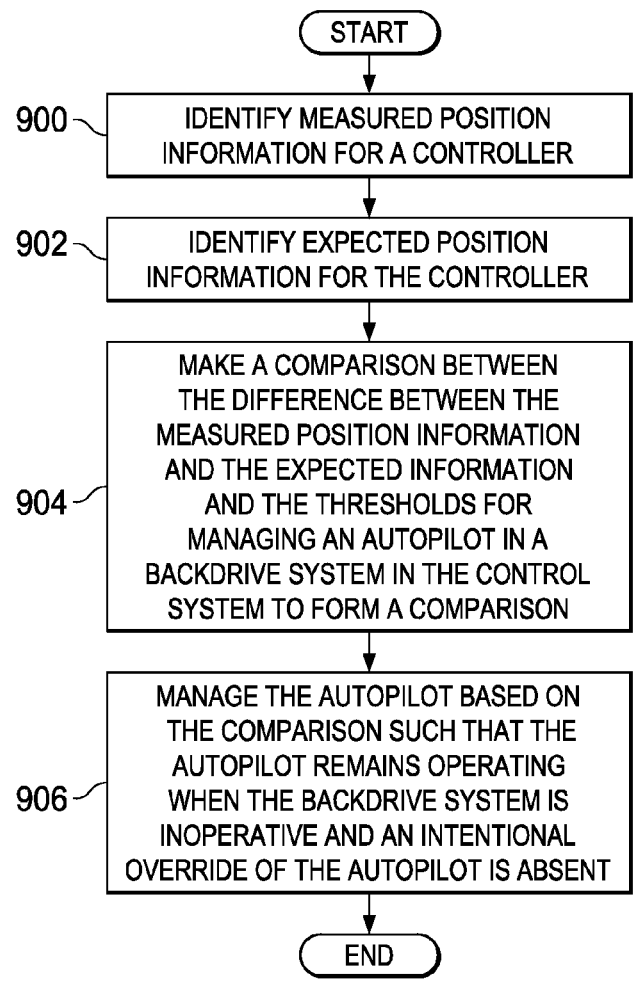
FIG. 9 is an illustration of a flowchart of a process for managing an autopilot in accordance with an advantageous embodiment.

With reference now to FIG. 9, an illustration of a flowchart of a process for managing an autopilot is depicted in accordance with an advantageous embodiment. The process illustrated in FIG. 9 may be implemented in control system 216 in aircraft 200 in FIG. 2. In particular, this process may be implemented using monitoring module 308 in FIG. 3 in these illustrative examples. The different operations in this and other flowcharts may be implemented in software, hardware, or a combination of software and hardware.

The process begins by identifying measured position information for a controller (operation 900). This controller may be a controller within number of controllers 302 in FIG. 3. The process then identifies expected position information for the controller (operation 902).

A comparison is then made between the difference between the measured position information and the expected information and the thresholds for managing an autopilot in a backdrive system in the control system to form a comparison (operation 904). The process then manages the autopilot based on the comparison such that the autopilot remains operating when the backdrive system is inoperative and an intentional override of the autopilot is absent (operation 906), with the process terminating thereafter. The process also may manage the backdrive system based on the difference, depending on the particular implementation.

Figure 10:
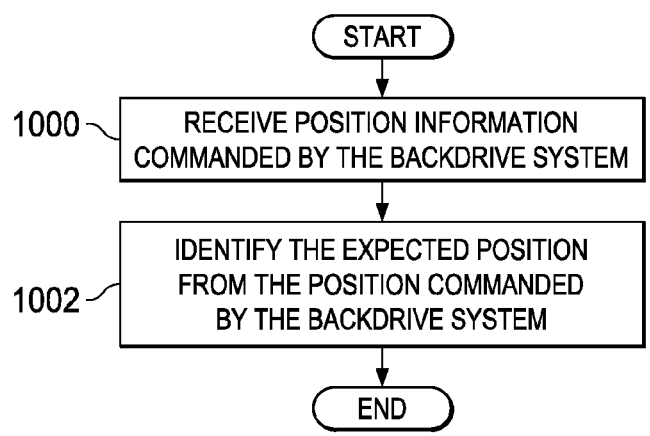
FIG. 10 is an illustration of a flowchart of a process for identifying expected position information in accordance with an advantageous embodiment.

With reference now to FIG. 10, an illustration of a flowchart of a process for identifying expected position information is depicted in accordance with an advantageous embodiment. The operations in FIG. 10 are examples of operations that may be used in operation 902 in FIG. 9. These operations are performed when the backdrive system is operating.

The process begins by receiving position information commanded by the backdrive system (operation 1000). The process then identifies the expected position from the position commanded by the backdrive system (operation 1002), with the process terminating thereafter. This operation takes into account the time needed to reach the position commanded by the backdrive system from the current position and uses the position of the controller identified in operation 900 in FIG. 9.

Figure 11:
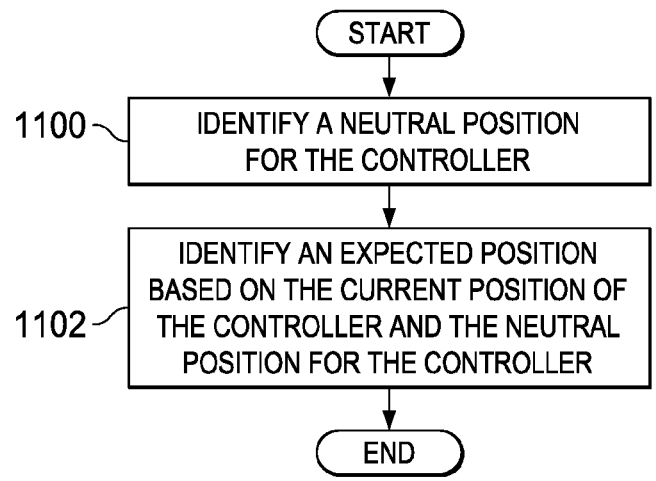
FIG. 11 is an illustration of a flowchart of another process for identifying expected position information in accordance with an advantageous embodiment.

With reference now to FIG. 11, an illustration of a flowchart of a further process for identifying expected position information is depicted in accordance with an advantageous embodiment. The different operations in this figure are examples of operations that may be performed in operation 902 in FIG. 9. These operations are performed when the backdrive system is inoperative.

The process begins by identifying a neutral position for the controller (operation 1100). The neutral position is the position that a controller is expected to be in or return to when the backdrive system is inoperative. The process then identifies an expected position based on the current position of the controller and the neutral position for the controller (operation 1102), with the process terminating thereafter. In this example, the current position is obtained from the measured position information in operation 900 in FIG. 9.

Figure 12:
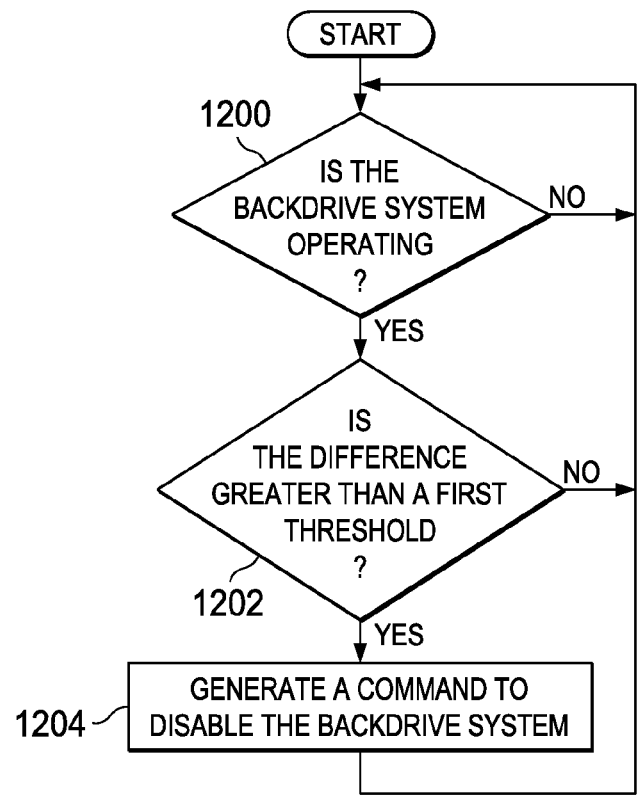
FIG. 12 is a flowchart of a process for managing a backdrive system in accordance with an advantageous embodiment.

With reference now to FIG. 12, an illustration of a flowchart of a process for managing a backdrive system is depicted in accordance with an advantageous embodiment. The different operations illustrated in FIG. 12 are examples of operations that may be performed as part of operation 906 in FIG. 9.

The process begins by determining whether the backdrive system is operating (operation 1200). If the backdrive system is operating, a determination as to whether the difference is greater than a first threshold is made (operation 1202). This difference is the difference identified in operation 904 in FIG. 9. If the difference is greater than the first threshold, the backdrive system is not considered to be operating properly. In other words, the backdrive system is considered to be inoperative. The process then generates a command to disable the backdrive system (operation 1204), with the process then returning to operation 1200.

With reference again to operation 1202, if the difference is not greater than the first threshold, the process returns to operation 1200. With reference again to operation 1200, if the backdrive system is not operating, the process also returns to operation 1200. In other words, the process loops back. The return to operation 1200 takes into account that the backdrive system may be inoperative for a number of different reasons. For example, the pilot or other operator may have turned off the backdrive system. At a later time, the backdrive system may be turned on and operating again.

Figure 13:
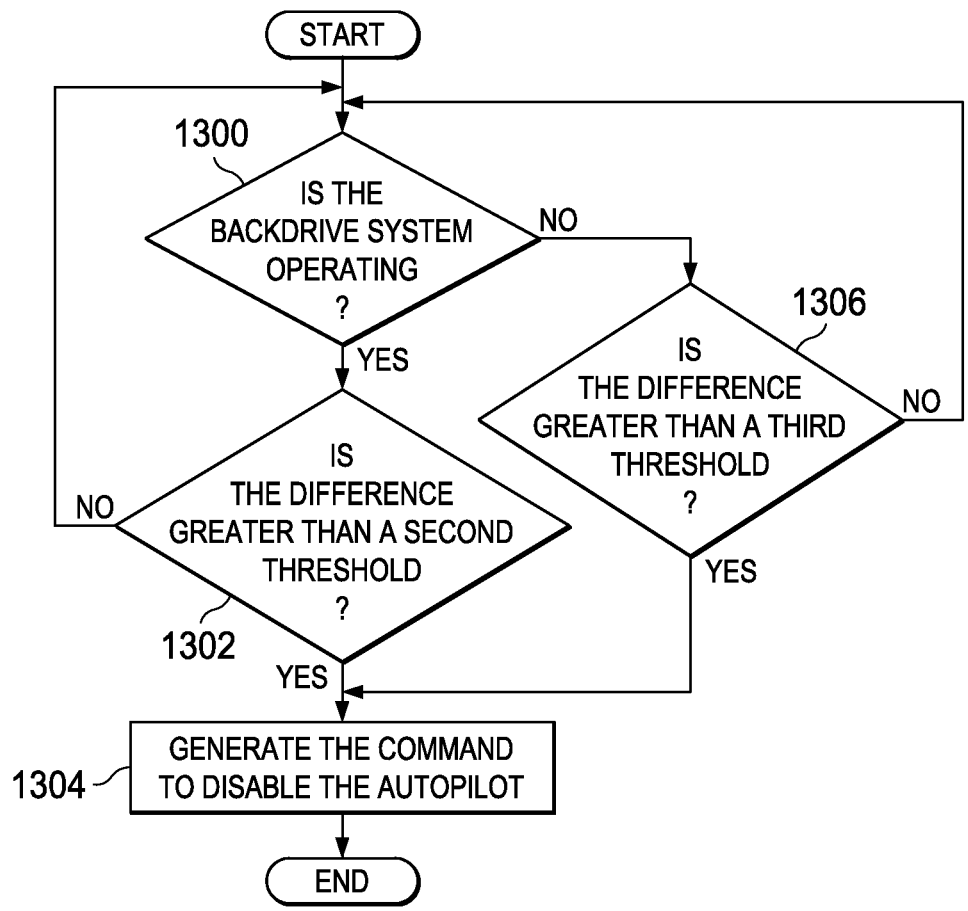
FIG. 13 is an illustration of a flowchart of a process for managing an autopilot in accordance with an advantageous embodiment.

With reference now to FIG. 13, an illustration of a flowchart of a process for managing an autopilot is depicted in accordance with an advantageous embodiment. The process illustrated in FIG. 13 includes operations that may be performed as part of operation 906 in FIG. 9 to manage an autopilot.

The process begins by determining whether the backdrive system is operating (operation 1300). If the backdrive system is operating, a determination as to whether the difference is greater than a second threshold is made (operation 1302). The second threshold is used to determine whether an intentional override has occurred with respect to the control when the backdrive system is operating. The second threshold is selected to take into account that the backdrive system is operating.

If the difference is greater than the second threshold, the process generates the command to disable the autopilot (operation 1304), with the process terminating thereafter.

With reference again to operation 1302, if the difference is not greater than the second threshold, the process returns to operation 1300. With reference again to operation 1300, if the backdrive system is not operating, the process determines whether the difference is greater than a third threshold (operation 1306). This third threshold is selected to take into account that the backdrive system is not operating in determining whether an intentional override of the autopilot has occurred. If the difference is greater than a third threshold, the process proceeds to operation 1304 as described above. Otherwise, the process returns to operation 1300.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 14, an illustration of a data processing system is depicted in accordance with an advantageous embodiment. In this illustrative example, data processing system 1400 includes communications fabric 1402, which provides communications between processor unit 1404, memory 1406, persistent storage 1408, communications unit 1410, input/output (I/O) unit 1412, and display 1414. Data processing system 1400 is an example of a data processing system that may be used to implement flight control computer 304 in FIG. 3.

Processor unit 1404 serves to execute instructions for software that may be loaded into memory 1406. Processor unit 1404 may be a number of processors, a multi-processor core, or some other type of processor, depending on the particular implementation. A "number", as used herein with reference to an item, means "one or more items." Further, processor unit 1404 may be implemented using a number of heterogeneous processor systems in which a main processor is present with secondary processors on a single chip. In another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different advantageous embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these examples. In one example, computer readable media 1420 may be computer readable storage media 1424 or computer readable signal media 1426.

Computer readable storage media 1424 may include, for example, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400.

In some instances, computer readable storage media 1424 may not be removable from data processing system 1400. In these examples, computer readable storage media 1424 is a physical or tangible storage device used to store program code 1418, rather than a medium that propagates or transmits program code 1418. Computer readable storage media 1424 is also referred to as a computer readable tangible storage device or a computer readable physical storage device. In other words, computer readable storage media 1424 is a media that can be touched by a person.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1418 may be downloaded over a network to persistent storage 1408 from another device or data processing system through computer readable signal media 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different advantageous embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1404 may take the form of a hardware unit that has circuits that are manufactured or configured for a particular use. This type of hardware may perform operations without needing program code to be loaded into a memory from a storage device to be configured to perform the operations.

For example, when processor unit 1404 takes the form of a hardware unit, processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1418 may be omitted because the processes for the different embodiments are implemented in a hardware unit.

In still another illustrative example, processor unit 1404 may be implemented using a combination of processors found in computers and hardware units. Processor unit 1404 may have a number of hardware units and a number of processors that are configured to run program code 1418. With this depicted example, some of the processes may be implemented in the number of hardware units, while other processes may be implemented in the number of processors.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of one or more devices that transmit data, receive data, or transmit and receive data. A communications unit may be, for example, a modem or a network adapter, two network adapters, or some combination thereof. Further, a memory may be, for example, memory 1406, or a cache, such as found in an interface and memory controller hub that may be present in communications fabric 1402.

Thus, the different advantageous embodiments provide a method and apparatus for managing an autopilot. In one advantageous embodiment, a difference is identified between measured position information for a controller and expected position information for the controller. A comparison is made between the difference between the measured position information and the expected position information and thresholds for managing an autopilot system in the control system to perform a comparison. An operation of the autopilot is managed based on the comparison such that the autopilot remains operating when a backdrive system is inoperative and an intentional override of the autopilot is absent.

Further, in an advantageous embodiment, this process also may be used to manage the backdrive system. Further, the measured position information and the expected position information may be actual positions, direction of movement, velocity, and other suitable types of information for the controller.

In this manner, the different advantageous embodiments allow for an autopilot to remain operating even if a backdrive system becomes inoperative. In this manner, a pilot or other operator of an aircraft or other vehicle may perform other operations while the autopilot continues to operate the vehicle even though the backdrive system is inoperative. As a result, the operator of a vehicle may have more time to pay attention to other operations other than controlling movement of the vehicle.

The description of the different advantageous embodiments has been presented for purposes of illustration and description and is not intended to be exhaustive or limited to the advantageous embodiments in the form disclosed. Many modifications and variations will be apparent to those of ordinary skill in the art. Further, different advantageous embodiments may provide different advantages as compared to other advantageous embodiments. The advantageous embodiment or embodiments selected are chosen and described in order to best explain the principles of the advantageous embodiments, the practical application, and to enable others of ordinary skill in the art to understand the disclosure for various advantageous embodiments with various modifications as are suited to the particular use contemplated.

What is claimed is:

1. An apparatus comprising:
a monitoring module of a flight control computer, the monitoring module configured to:
identify a difference between measured position information for a controller and expected position information for the controller;
compare the difference with thresholds for managing an autopilot in a control system of a vehicle to form a comparison; and
manage an operation of the autopilot based on the comparison such that the autopilot remains operating when a backdrive system is inoperative and an intentional override of the autopilot is absent.

2. The apparatus of claim 1, wherein in being configured to compare the difference with the thresholds for managing the autopilot in the control system of the vehicle to form the comparison, the monitoring module is configured to determine whether the difference is greater than one or more of the thresholds that are active to form the comparison, wherein the one or more of the thresholds that is active is based on a state of the control system.

3. The apparatus of claim 2, wherein the thresholds comprise a first threshold configured to detect the backdrive system being inoperative when the backdrive system is supposed to be operating, a second threshold configured to detect the intentional override of the autopilot when the autopilot and the backdrive system are both operating, and a third threshold configured to detect the intentional override of the autopilot when the autopilot is operating and the backdrive system is inoperative.

4. The apparatus of claim 3, wherein the third threshold is active when a status of the backdrive system is inoperative.

5. The apparatus of claim 3, wherein the monitoring module further comprises:
   a position difference module configured to identify the difference between the measured position information for the controller and the expected position information for the controller;
   a backdrive system disabling module connected to the position difference module and configured to generate a first signal to disable the backdrive system when the backdrive system is operating and when the difference is greater than the first threshold;
   a first override module connected to the position difference module and configured to generate a second signal to disable the autopilot when the autopilot and the backdrive system are both operating and when the difference is greater than the second threshold; and
   a second override module connected to the position difference module and configured to generate a third signal to disable the autopilot when the autopilot is operating and the backdrive system is inoperative and when the difference is greater than the third threshold.

6. The apparatus of claim 5, wherein the second override module compares the difference to the third threshold when the autopilot is operating and the backdrive system is inoperative.

7. The apparatus of claim 1, wherein the expected position information is selected from one of a position of the controller based on a position of a control surface associated with the controller and a neutral position if the backdrive system is inoperative.

8. The apparatus of claim 1, wherein the monitoring module is further configured to manage both the autopilot and the backdrive system based on the comparison.

9. The apparatus of claim 1, wherein the thresholds include a first threshold, a second threshold, and a third threshold and wherein the second threshold is greater than the first threshold and wherein the third threshold is selected from one of being greater than the second threshold, being between the first threshold and the second threshold, and being equal to the second threshold.

10. The apparatus of claim 1, wherein the measured position information and the expected position information are identified using a sensor associated with the controller.

11. The apparatus of claim 1, wherein the controller is selected from one of a column, a wheel, a flight stick, a lever, a throttle lever, a control yoke, and pedals and wherein the vehicle is selected from one of an aircraft, an automobile, a tank, a personnel carrier, a submarine, a ship, and a spacecraft.

12. A method of a control system of an autopilot of a vehicle, the method comprising:
   identifying a difference between measured position information for a controller and expected position information for the controller;
   comparing the measured position information and the expected position information with thresholds for managing the autopilot in a control system to form a comparison; and
   managing an operation of the autopilot based on the comparison such that the autopilot remains operating when a backdrive system is inoperative and an intentional override of the autopilot is absent.

13. The method of claim 12, wherein the comparing step further comprises:
   determining if the difference is greater than one or more of the thresholds that is active to form the comparison, wherein the one or more of the thresholds that is active is based on a state of the control system.

14. The method of claim 13, wherein the comparing step further comprises:
   comparing the measured position information and the expected position information with the thresholds for managing the autopilot in the control system to form the comparison, wherein the thresholds comprise a first threshold configured to detect the backdrive system being inoperative when the backdrive system is supposed to be operating, a second threshold configured to detect an intentional override of the autopilot when the autopilot and the backdrive system are both operating, and a third threshold configured to detect the intentional override of the autopilot when the autopilot is operating and the backdrive system is inoperative.

15. The method of claim 12, wherein the comparing step further comprises:
   comparing the measured position information and the expected position information with the thresholds for managing the autopilot in the control system to form the comparison, wherein the thresholds comprise a first threshold configured to detect the backdrive system being inoperative when the backdrive system is supposed to be operating, a second threshold configured to detect the intentional override of the autopilot when the autopilot and the backdrive system are both operating, and a third threshold configured to detect the intentional override of the autopilot when the autopilot is operating and the backdrive system is inoperative in which the third threshold is active when a status of the backdrive system is inoperative.

16. The method of claim 15, wherein the step of managing the operation of the autopilot based on the comparison such that the autopilot remains operating when the backdrive system is inoperative and the intentional override of the autopilot is absent further comprises:
   managing the operation of the autopilot and the backdrive system based on the difference such that the backdrive system is disabled when the backdrive system is operating and when the difference is greater than the first threshold; the autopilot is disabled when the autopilot and the backdrive system are both operating and when the difference is greater than the second threshold; and the autopilot is disabled when the autopilot is operating and the backdrive system is inoperative and when the difference is greater than the third threshold.

17. The method of claim 12, wherein the identifying step comprises: identifying the difference between the measured position information for the controller and the expected position information for the controller, wherein the expected position information is selected from one of a position of the controller based on the position of a control surface associated with the controller and a neutral position if the backdrive system is inoperative.

18. A computer program product comprising:
a computer readable storage medium;
first program code for identifying a difference between measured position information for a controller and expected position information for the controller;
second program code for comparing the difference with thresholds for managing an autopilot in a control system of a vehicle to form a comparison; and
third program code for managing an operation of the autopilot based on the comparison such that the autopilot remains operating when a backdrive system is inoperative and an intentional override of the autopilot is absent, wherein the first program code, the second program code, and the third program code are stored on the computer readable storage medium.

19. The computer program product of claim 18, wherein the second program code further comprises:
fourth program code for determining if the difference is greater than one or more of the thresholds that are active to form the comparison, wherein the one or more of the thresholds that is active is based on a state of the control system.

20. The computer program product of claim 18, wherein the thresholds further comprise a first threshold configured to detect a backdrive system being inoperative when the backdrive system is supposed to be operating, a second threshold configured to detect the intentional override of the autopilot when the autopilot and the backdrive system are both operating, and a third threshold configured to detect the intentional override of the autopilot when the autopilot is operating and the backdrive system is inoperative.

* * * * *